(12) United States Patent
Pan et al.

(10) Patent No.: US 10,898,409 B2
(45) Date of Patent: Jan. 26, 2021

(54) MASSAGE MECHANISM AND ITS MASSAGER

(71) Applicant: SHENZHEN FORREST HEALTH TECHNOLOGY CO., LTD, Shenzhen (CN)

(72) Inventors: Jianzhong Pan, Shenzhen (CN); Hailin Liu, Shenzhen (CN)

(73) Assignee: SHENZHEN FORREST HEALTH TECHNOLOGY CO., LTD., Shenzhen (CN)

( * ) Notice: Subject to any disclaimer, the term of this patent is extended or adjusted under 35 U.S.C. 154(b) by 382 days.

(21) Appl. No.: 15/766,500

(22) PCT Filed: Oct. 18, 2017

(86) PCT No.: PCT/CN2017/106619
§ 371 (c)(1),
(2) Date: Apr. 6, 2018

(87) PCT Pub. No.: WO2018/133465
PCT Pub. Date: Jul. 26, 2018

(65) Prior Publication Data
US 2019/0053971 A1     Feb. 21, 2019

(30) Foreign Application Priority Data

Jan. 17, 2017 (CN) .................... 2017 2 0051540 U

(51) Int. Cl.
*A61H 7/00*     (2006.01)
*A61H 15/00*     (2006.01)
(Continued)

(52) U.S. Cl.
CPC ......... *A61H 7/007* (2013.01); *A61H 15/0078* (2013.01); *A61H 23/006* (2013.01); *A61H 99/00* (2013.01); *F16H 1/16* (2013.01); *F16H 7/023* (2013.01); *F16H 23/10* (2013.01); *A61H 2007/009* (2013.01);
(Continued)

(58) Field of Classification Search
CPC .......... A61H 7/00; A61H 7/002; A61H 7/004; A61H 7/007; A61H 7/009
See application file for complete search history.

(56) References Cited

U.S. PATENT DOCUMENTS

2002/0082534 A1*    6/2002    Jikiba .................. G01D 5/2013
                                                                                         601/99
2002/0161316 A1*   10/2002    Shimizu .................. A61H 7/00
                                                                             601/98

(Continued)

*Primary Examiner* — Samchuan C Yao
*Assistant Examiner* — Matthew Standard
(74) *Attorney, Agent, or Firm* — Bayramoglu Law Offices LLC

(57) ABSTRACT

A massage mechanism and its massager. The massage mechanism includes a base, motor, drive assembly, first drive shaft, first bearing, first massage drive assembly, first massage head assembly, inter-shaft drive assembly, second transmission shaft, second bearing, second massage drive assembly and second massage head. There is also provided a massager including the foregoing massage mechanism. The mechanism could optimize those unstable and noisy features for an ideal massage experience, and solve the problem that multiple massage actions cannot be driven by a single motor.

9 Claims, 3 Drawing Sheets

(51) Int. Cl.
*A61H 99/00* (2006.01)
*A61H 23/00* (2006.01)
*F16H 1/16* (2006.01)
*F16H 7/02* (2006.01)
*F16H 23/10* (2006.01)

(52) U.S. Cl.
CPC ............... *A61H 2015/0028* (2013.01); *A61H 2201/0149* (2013.01); *A61H 2201/0165* (2013.01); *A61H 2201/1215* (2013.01); *A61H 2201/149* (2013.01); *A61H 2201/1427* (2013.01); *A61H 2201/1463* (2013.01); *A61H 2201/1481* (2013.01); *A61H 2201/1623* (2013.01); *A61H 2201/1654* (2013.01); *A61H 2201/1676* (2013.01); *A61H 2201/1678* (2013.01)

(56) References Cited

U.S. PATENT DOCUMENTS

| | | | | |
|---|---|---|---|---|
| 2006/0074358 A1* | 4/2006 | Hsieh | ..................... | A61H 7/001 601/90 |
| 2006/0293618 A1* | 12/2006 | Hsieh | ..................... | A61H 7/00 601/133 |
| 2012/0215143 A1* | 8/2012 | Inada | ..................... | A61H 1/003 601/112 |
| 2017/0273857 A1* | 9/2017 | Ishikawa | ............ | A61H 23/0263 |

* cited by examiner

MASSAGE MECHANISM AND ITS MASSAGER

FIELD

The utility model relates to massage appliance field, especially to a massage mechanism and its massager.

BACKGROUND

In modern urban life, people's pace of life is becoming faster and faster. Most people are overwhelmed with heavy work in the daytime. And after work, they need to care for the children and the house, leaving little time for rest after a busy day. Hence, such a long-term busy life may cause discomfort and even some diseases. For example, some body parts like neck and shoulders may be attacked by sore muscles, worn tendons and other various discomfort caused by overwork. If some pain relief and treatments are not given in time, these indispositions will inevitably transform into irreversible diseases and have great influence to future physical health. Massager emerged at the right moment to reduce tiredness, promote blood circulation and get physical relaxation and prevent disease. But most massager on the market exist some unstable features with a little bit noise; what's more, multiple massage actions cannot be driven by a single motor so that simultaneous massage cannot be realized, for which the massage experience need to be improved.

SUMMARY

The utility model aims to optimize those unstable and noisy features for ideal massage experience, and solve the problem that multiple massage actions cannot be driven by a single motor.

To solve above problems, the utility model provides a massage mechanism, comprising base, motor, drive assembly, first drive shaft, first bearing, first massage drive assembly, first massage head assembly, inter-shaft drive assembly, second transmission shaft, second bearing, second massage drive assembly and second massage head. The motor is assembled on the base; the first bearing is nested to the two ends of the first driving shaft and fixed at the base; the second bearing is nested to the two ends of the second driving shaft and fixed at the base; the motor is connected with the first drive shaft by the drive assembly; while the first drive shaft and the second drive shaft are connected through the shaft drive assembly; the first drive shaft and the second drive shaft shall be driven synchronously when the motor is started;

The two groups of the first massage drive assembly, equipped with the first massage head assembly, are set in symmetry at two ends of the first drive shaft respectively. When the motor is operated, the first drive shaft shall drive the two first massage head assemblies to twist repeatedly towards left and right symmetrically, kneading and releasing the massage part alternately with medial extrusion and lateral relaxation;

The two groups of the second massage drive assembly, fixed with the second massage head, are symmetrically set at two ends of the second drive assembly respectively; when the user turns on the motor, the second drive shaft shall drive the two second massage heads to rotate up and down synchronously in arc shape to form repeated pushing and stretching actions on massage part.

For a preferred scheme, the inter-shaft drive assembly comprises first pulley, transmission belt and second pulley. The first pulley is nested and fixed in the first drive shaft; the second drive shaft is assembled in parallel with the first drive shaft. Nested and fixed in the second drive shaft, the second pulley is connected with the first pulley through the transmission belt.

For a preferred scheme, the drive assembly comprises worm and gear. The gear is nested and fixed in middle part of the first drive shaft. The worm, with which the gear is meshed, is connected with the motor or fixed at the motor shaft.

For a preferred scheme, the first massage drive assembly comprises first reclining wheel, second reclining wheel and first limit chute. The first limit chute is fixed at above base; Nested and fixed in the first drive shaft, the first reclining wheel and the second reclining wheel connect with each other, jointly forming inclined annular groove. The first massage head assembly comprises massage head matrix with collar and slider. The collar which is nested between the first reclining wheel and the second reclining wheel coordinates with the inclined annular groove; the slider fixed at the bottom of the collar coordinates with the first limit chute. When it works, the first drive shaft drives the first reclining wheel and the second reclining wheel to rotate together. The first massage head assembly has right and left repeated torsion under the joint actions of the inclined annular groove and the first limit chute.

For a preferred scheme, the second massage drive assembly comprises eccentric gear, fixed shaft and second limit chute. The fixed shaft is fixed at the base; nested and fixed in the second drive shaft, the eccentric gear has its one end face equipped with eccentric boss column which can be connected to the second limit chute by slipping. The second massage head shares a swing and a rolling ball. The rolling ball could connect to the top end of the swing rotationally and there is a shaft hole which connects to the fixed shaft at the bottom of the swing. With the second limit chute on it, the swing could be rotated around the fixed shaft. When it works, the second drive shaft drives the eccentric gear to rotate, while the eccentric boss column slides relatively on the second limit chute and drives the second massage head to rotate repeatedly up and down in arc shape.

For a preferred scheme, the first massage head assembly comprises massage head matrix, massage swinging arm, spring and pin. The massage head swinging arm could be connected to the massage head matrix by rotation. Two ends of the spring are connected to the massage head matrix and the massage head swinging arm respectively.

For a preferred scheme, the first pulley and the second pulley are synchronous pulleys and the transmission belt is a synchronous belt.

For a preferred scheme, the gear is a helical gear.

For a preferred scheme, the coordinated connection between the first reclining wheel and the second reclining wheel is a coordinated connection between convex column and groove.

In addition, to solve the same problems, the utility model also provides a massager, which comprises the foregoing massage mechanism with any mentioned content.

The utility model provides a massage mechanism and its massager. Compared with current technology, the first drive shaft can drive the two first massage head assemblies to twist repeatedly towards left and right in symmetry when the motor is started to knead and release the massage part alternately with medial extrusion and lateral relaxation. Meanwhile, the second drive shaft can drive the two second massage heads to rotate up and down synchronously in arc shape to form repeated pushing and stretching actions on massage part. It can be seen that the utility model improves the massage experience and reaches the aim that one motor could drive multiple massage actions for simultaneous massage effect.

Where: 1. Base; 2. Motor; 3. Drive Assembly; 31. Worm; 32. Gear; 4. First Drive Axle; 41. First Bearing; 5. First Massage Drive Assembly; 51. First Reclining Wheel; 52. Second Reclining Wheel; 53. First Limit Chute; 6. First Massage Head Assembly; 61. Massage Head Matrix; 62. Massage Head Swinging Arm; 63. Pin; 64. Spring; 7. Inter-shaft Drive Assembly; 71. First Pulley; 72. Transmission Belt; 73. Second Pulley; 8. Second Transmission Belt; 81. Second Bearing; 9. Second Massage Drive Assembly; 91. Eccentric Gear; 92. Fixed Shaft; 93. Second Limit Chute; 10. Second Massage Head.

DETAILED DESCRIPTION

Further detailed descriptions of the utility model will be given by attached illustrations and embodiments hereinafter. Following embodiments are applied to illustrate the utility model but not restricted by scope of it.

Figure 1:
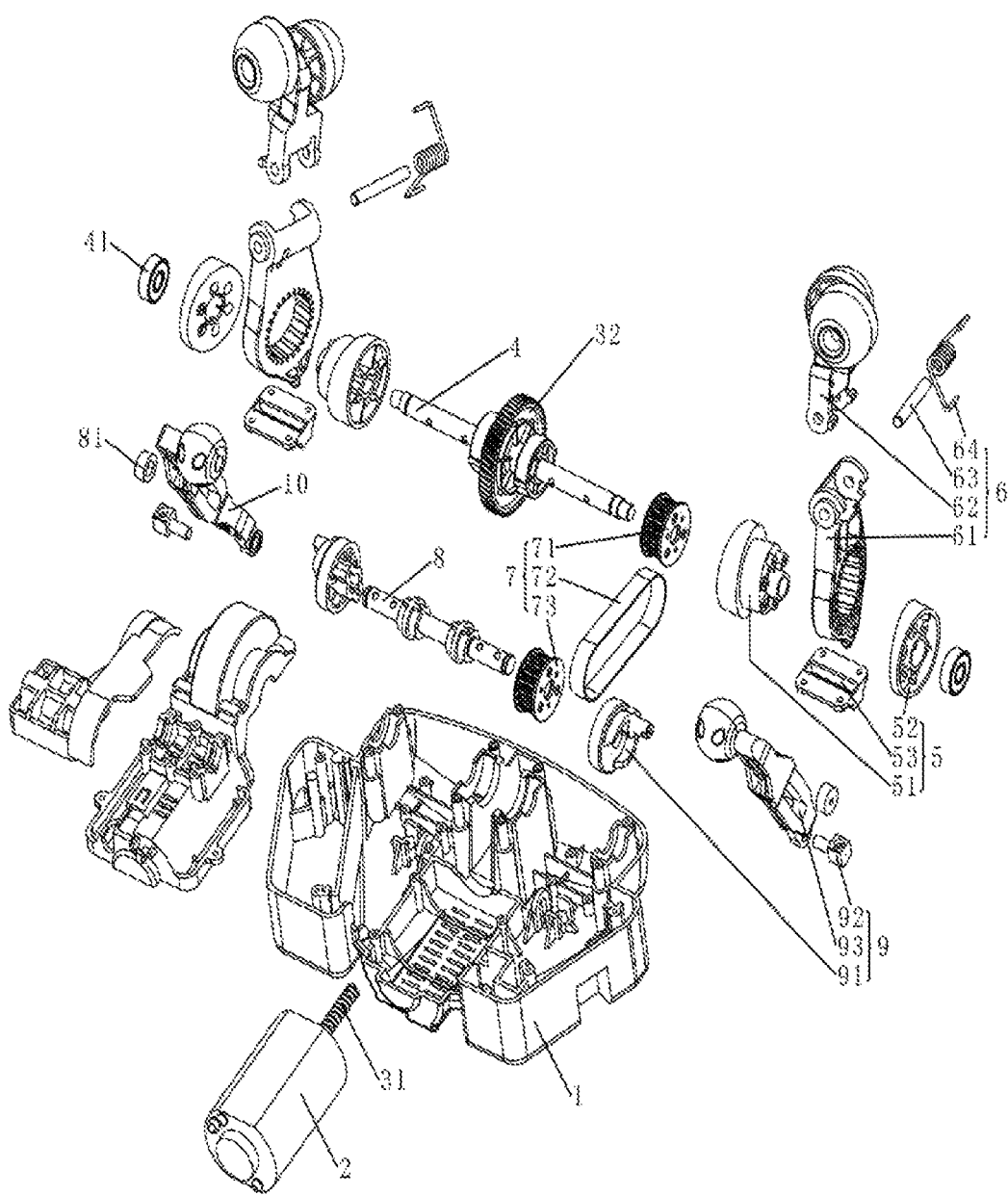
FIG. 1 is explosive view of massage mechanism for the utility model embodiment.
Figure 2:
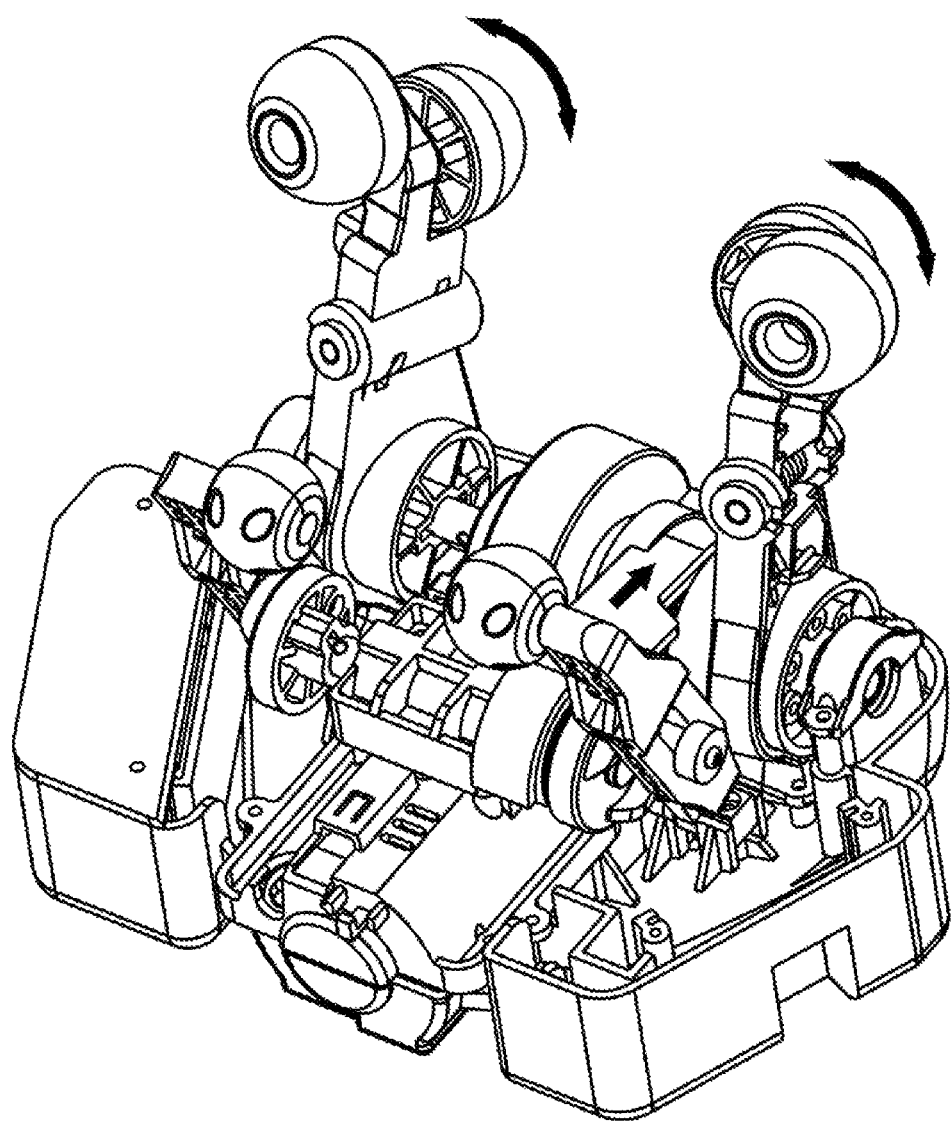
FIG. 2 is massage action diagram of the first massage head assembly in massage mechanism for the utility model embodiment.
Figure 3:
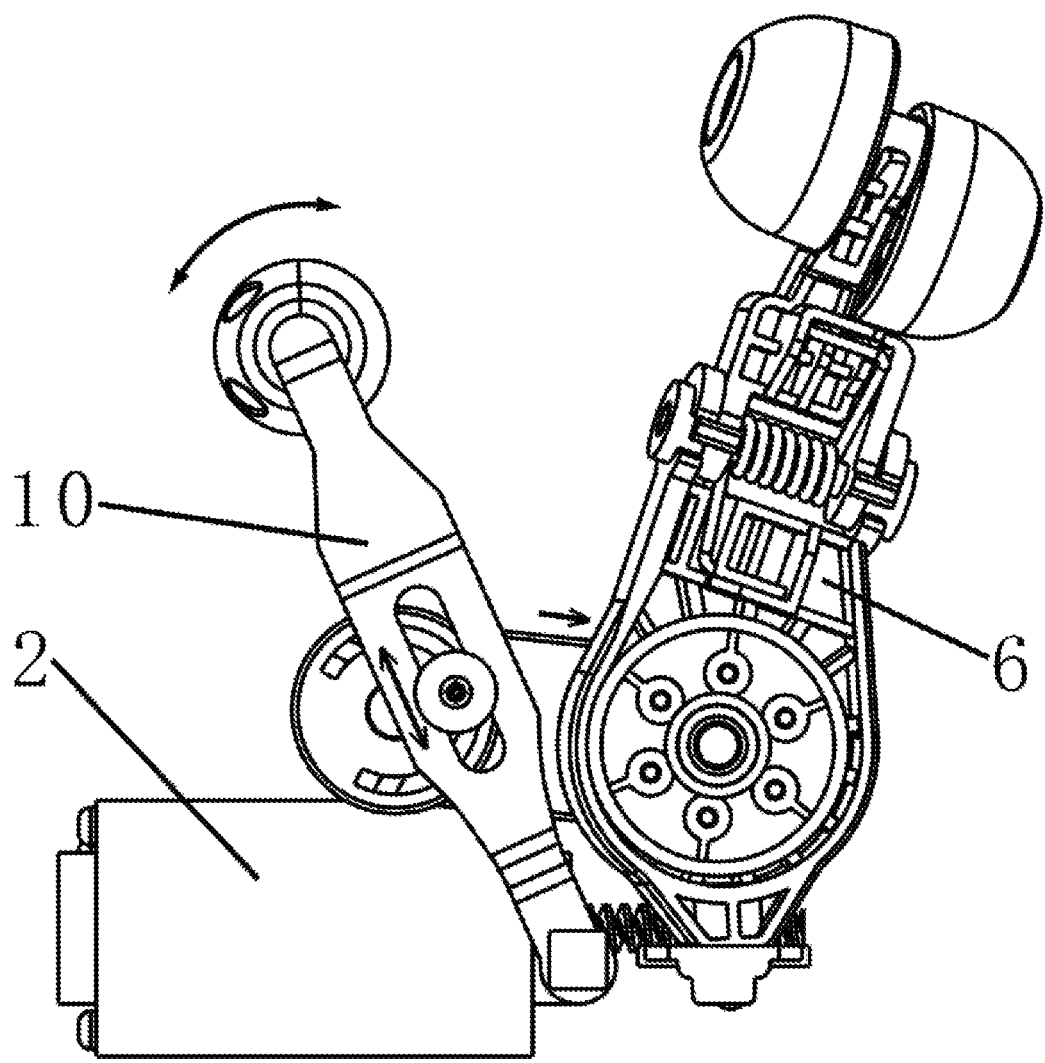
FIG. 3 is massage action diagram of the second massage head assembly for massage mechanism for the utility model embodiment.

Refer to FIG. 1 to FIG. 3, a massage mechanism for preferred embodiment of the utility model, comprising base 1, motor 2, drive assembly 3, first drive shaft 4, first bearing 41, massage drive assembly 5, first massage head assembly 6, inter-shaft drive assembly 7, second drive shaft 8, second bearing 81, second massage drive assembly 9 and second massage head 10. Motor 2 is fixed at base 1; first bearing 41 is nested to the two ends of first drive shaft 4 and fixed at base 1; the second bearing 81 is nested to the two ends of second drive shaft 8 and fixed at base 1; motor 2 is connected through drive assembly 3 and first drive shaft 4; first drive shaft 4 is connected with second driving shaft 8 by inter-shaft drive assembly 7. When motor 2 is operated, first drive shaft 4 and second driving shaft 8 will rotate synchronously;

The two groups of the first massage drive assembly 5, equipped with the first massage head assembly 6, are set in symmetry at two ends of the first drive shaft 4 respectively. When the motor 2 is operated, the first drive shaft 4 shall drive the two first massage head assemblies 6 to twist repeatedly towards left and right symmetrically, kneading and releasing the massage part alternately with medial extrusion and lateral relaxation;

The two groups of the second massage drive assembly 9, fixed with the second massage head 10, are symmetrically set at two ends of the second drive assembly 8 respectively; when the user turns on the motor 2, the second drive shaft 8 shall drive the two second massage heads 10 to rotate up and down synchronously in arc shape to form repeated pushing and stretching actions on massage part.

From the above, the utility model improves the massage experience and reaches the aim that one motor could drive multiple massage actions for simultaneous massage effect. Moreover, it features tight structure and low cost.

As a preferred example, the inter-shaft drive assembly 7 comprises first pulley 71, transmission belt 72 and second pulley 73. The first pulley 71 is nested and fixed in the first drive shaft 4; the second drive shaft 8 is assembled in parallel with the first drive shaft 4. Nested and fixed in the second drive shaft 8, the second pulley 73 is connected with the first pulley 71 through the transmission belt 72. Among the structure, the first pulley 71 and the second pulley 73 are synchronous pulleys and the transmission belt 72 is a synchronous belt. The massage experience has been greatly improved with multiple massage actions through synchronous belt installation among driving shafts to operate more stably and quietly.

As a preferred example, the drive assembly 3 comprises worm 31 and gear 32. The gear 32 is nested and fixed in middle part of the first drive shaft 4. The worm 31, with which the gear 32 is meshed, is connected with the motor 2. Motor 2 and the first driving shaft 4 are driven by the meshing of worm 31 and gear 32, which could simplify the structure, effectively improve the transmission stability, and guarantee the transmission reliability. Where, the gear 32 is a helical one. Helical gear is adapted for a better meshing, more stable transmission, lower noise, and higher contact ratio. It could be helpful to reduce the gear load, improve the loading capacity of gear, and then extend the service life of the gear.

As an example, the helical gear is connected with the first drive shaft 4. There are spacer bushes for limits at the two ends of the helical gear. Besides, cir-clips for shaft can be applied.

As a preferred example, the first massage drive assembly 5 comprises first reclining wheel 51, second reclining wheel 52 and first limit chute 53. The first limit chute 53 is fixed at above base 1; Nested and fixed in the first drive shaft 4, the first reclining wheel 51 and the second reclining wheel 52 connect with each other, jointly forming inclined annular groove. As an example, the coordinated connection between the first reclining wheel 51 and the second reclining wheel 52 is a coordinated connection between convex column and groove. Specifically, there are several boss columns at the end face of connection part of the first reclining wheel 51 and the second reclining wheel 52, while several grooves are installed at the end face of connection part of the second reclining wheel 52 and the first reclining wheel 51. It shows that coordinated connection with convex column-groove which is tight, simple and effective is easy for installation and disassembly as well as maintenance.

As a preferred example, the first massage head assembly 6 comprises massage head matrix 61, massage swinging arm 62, pin 63 and spring 64. The massage head swinging arm 62 could be connected to the massage head matrix 61 by rotation. Two ends of the spring 64 are connected to the massage head matrix 61 and the massage head swinging arm 62 respectively. The connection between the massage head matrix 61 and the massage head swinging arm 62 with springs for buffer action could provide more gentle massage experience. In addition, the first massage head assembly 6 can also only comprise massage head matrix 61 and massage swinging arm 62. The massage head swinging arm 62 could be directly connected with the top end of massage head matrix 61, which brings a more simple structure and lower processing cost.

The massage head matrix 61 of the first massage head assembly 6 comprises collar and slider. The collar which is nested between the first reclining wheel 51 and the second reclining wheel 52 coordinates with the inclined annular groove; the slider fixed at the bottom of the collar coordinates with the first limit chute 53. When it works, the first drive shaft 4 drives the first reclining wheel 51 and the second reclining wheel 52 to rotate together. The first massage head assembly 6 has right and left repeated torsion under the joint actions of the inclined annular groove and the first limit chute 53. Therefore, the transmission mechanism could be simplified by installing reclining wheel to control the trace of the first massage head assembly 6. In sync, the assembly is easily to twist towards right and left repeatedly for massage actions, especially for massage on neck, with higher quality somatological effect. As an example, flexible materials are applied in the collar to improve anti-fatigue performance.

As a preferred example, the second massage drive assembly 9 comprises eccentric gear 91, fixed shaft 92 and second limit chute 93. The fixed shaft 92 is fixed at the base 1; nested and fixed in the second drive shaft 8, the eccentric gear 91 has its one end face equipped with eccentric boss column which can be connected to the second limit chute 93 by slipping. The second massage head 10 shares a swing and a rolling ball. The rolling ball could connect to the top end of the swing rotationally and there is a shaft hole which connects to the fixed shaft 92 at the bottom of the swing. With the second limit chute 93 on it, the swing could be rotated around the fixed shaft 92. When it works, the second drive shaft 8 drives the eccentric gear 91 to rotate, while the eccentric boss column slides relatively on the second limit chute 93 and drives the second massage head 10 to rotate repeatedly up and down in arc shape. Therefore, transmission mechanism could be simplified by installing the eccentric gear 91 to control trace of the second massage head assembly 10. In sync, the massage head is easily to rotate repeatedly up and down in arc shape for massage actions, especially for massage on neck and shoulders, with higher quality somatological effect. As a further preferred example, there are bearings in the shaft hole, which makes the transmission more stable and smooth and reliable;

In addition, to solve same problems, the utility model also provides a massager comprising foregoing massage mechanism.

From the above, the utility model provides a massage mechanism and its massager. Compared with current technology, the first drive shaft can drive the two first massage head assemblies to twist repeatedly towards left and right in symmetry when the motor is started to knead and release the massage part alternately with medial extrusion and lateral relaxation. Meanwhile, the second drive shaft can drive the two second massage heads to rotate up and down synchronously in arc shape to form repeated pushing and stretching actions on massage part. It can be seen that the utility model improves the massage experience and reaches the aim that one motor could drive multiple massage actions for simultaneous massage effect.

The above statements are preferred embodiments for the utility model. It should be pointed out that for common technicians in the technical field, they can make some improvements or substitutions in accordance to technical principles of the utility model, while these improvements and substitutions should be deemed as protection scope of the utility model.

What is claimed is:

1. A massage mechanism, comprising: a base, motor, drive assembly, wherein the drive assembly comprises two groups of a first massage drive assembly and two groups of a second massage drive assembly, first drive shaft, a pair of first bearings, two first massage head assemblies, inter-shaft drive assembly, second transmission shaft, a pair of second bearings, and two second massage heads;

wherein the motor is assembled on the base; each of the first bearings are connected to each of two ends of the first driving shaft and the first driving shaft is fixed at the base; each of the second bearings are connected to each of two ends of the second driving shaft and the second driving shaft is fixed at the base; the motor is connected with the first drive shaft by the drive assembly; the first drive shaft and the second drive shaft are connected through the inter shaft drive assembly; the first drive shaft and the second drive shaft are configured to be driven synchronously when the motor is started;

the two groups of the first massage drive assembly, each equipped with one of the first massage head assembly, are set in symmetry at the two ends of the first drive shaft respectively; the first drive shaft is configured to drive the two first massage head assemblies to twist repeatedly towards left and right symmetrically, kneading and releasing a massage part alternately with a back and forth massage action;

the two groups of the second massage drive assembly, each fixed with one of the second massage head, are symmetrically set at the two ends of the second drive assembly respectively; and the second drive shaft is configured to drive the two second massage heads to rotate up and down synchronously in an arc shape to form repeated pushing and stretching actions on the massage part, wherein each of the second massage drive assemblies comprise an eccentric gear, fixed shaft and second limit chute; the fixed shaft is fixed at the base; nested and fixed in the second drive shaft, the eccentric gear has its one end face equipped with eccentric boss column which is configured to be connected to the second limit chute by slipping; each of the second massage heads comprises a swing and a rolling ball; the rolling ball connects to the top end of the swing rotationally and there is a shaft hole which connects to the fixed shaft at the bottom of the swing; with the second limit chute on it, the swing is rotated around the fixed shaft; and wherein the second drive shaft is configured to drive the eccentric gear to rotate while the eccentric boss column slides relatively on the second limit chute and drives the each of the second massage heads to rotate repeatedly up and down in the arc shape.

2. The massage mechanism of claim 1, wherein the inter-shaft drive assembly comprises a first pulley, transmission belt and second pulley;

the first pulley is connected to the first drive shaft;

the second drive shaft is assembled in parallel with the first drive shaft, and nested and fixed in the second drive shaft, the second pulley is connected with the first pulley through the transmission belt.

3. The massage mechanism of claim 1, wherein the drive assembly comprises a worm and gear;

the gear is nested and fixed in a middle part of the first drive shaft; and the worm, with which the gear is meshed, is connected with the motor or fixed a motor shaft.

4. The massage mechanism of claim 1, wherein each of the first massage drive assemblies comprise a first reclining wheel, second reclining wheel and first limit chute; the first limit chute is fixed above the base;

nested and fixed in the first drive shaft, the first reclining wheel and the second reclining wheel connect with each other, jointly forming inclined annular groove;

the first massage head assembly comprises massage head matrix with collar and slider;

the collar which is nested between the first reclining wheel and the second reclining wheel coordinates with the inclined annular groove;

the slider fixed at the bottom of the collar coordinates with the first limit chute;

wherein the first drive shaft is configured to drive the first reclining wheel and the second reclining wheel to rotate together; and the first massage head assembly has right and left repeated torsion under the joint actions of the inclined annular groove and the first limit chute.

5. The massage mechanism of claim 1, wherein each of the first massage head assemblies comprises a massage head matrix, massage swinging arm, spring and pin;

the massage head swinging arm is connected to the massage head matrix by rotation; and two ends of the spring are connected to the massage head matrix and the massage head swinging arm respectively.

6. The massage mechanism of claim 2, wherein the first pulley and the second pulley are synchronous pulleys and the transmission belt is a synchronous belt.

7. The massage mechanism of claim 3, wherein gear is a helical gear.

8. The massage mechanism of claim 4, wherein a coordinated connection between the first reclining wheel and the second reclining wheel is between convex columns and grooves.

9. A massager comprising the massage mechanism of claim 1.

* * * * *